Patented July 7, 1931

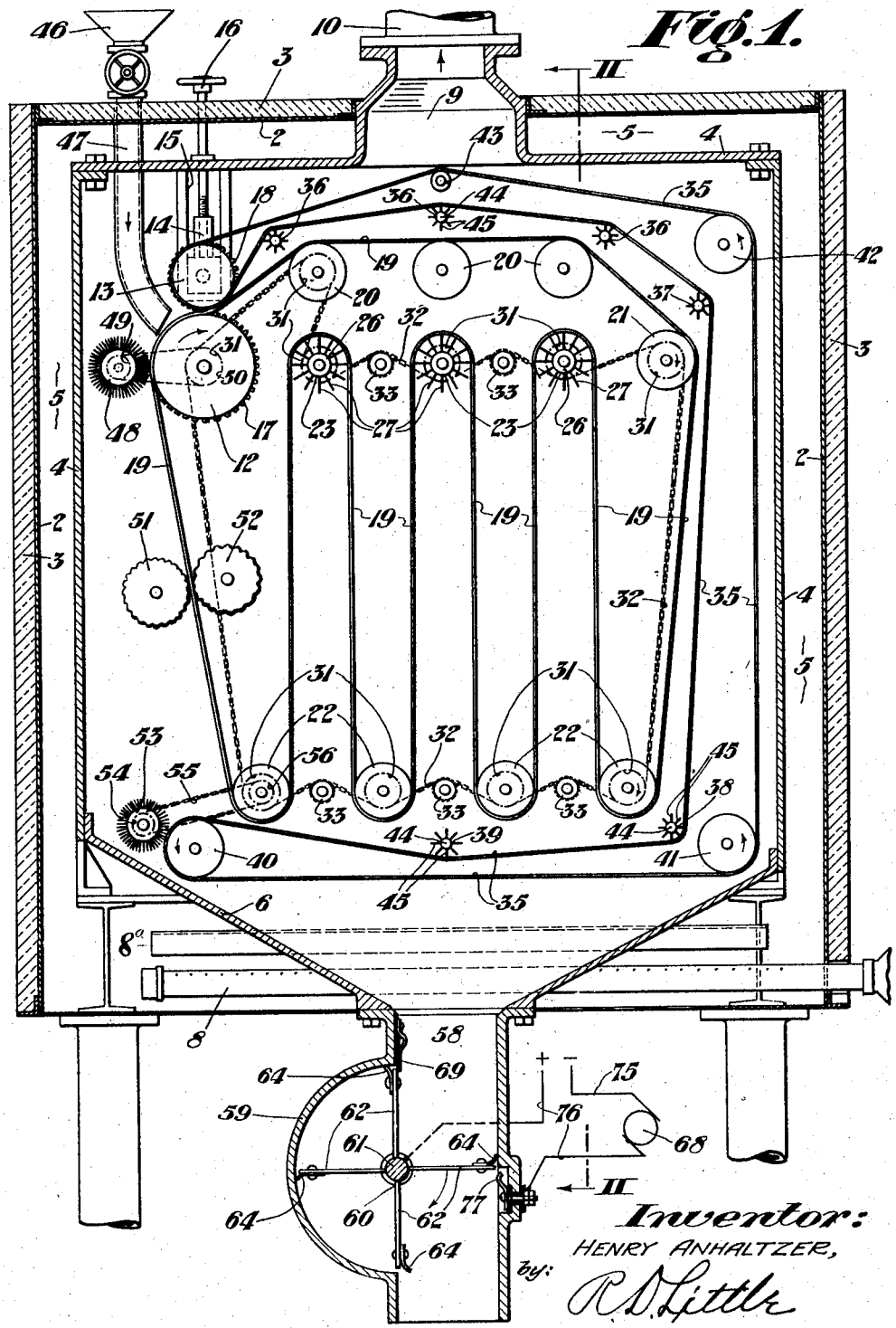

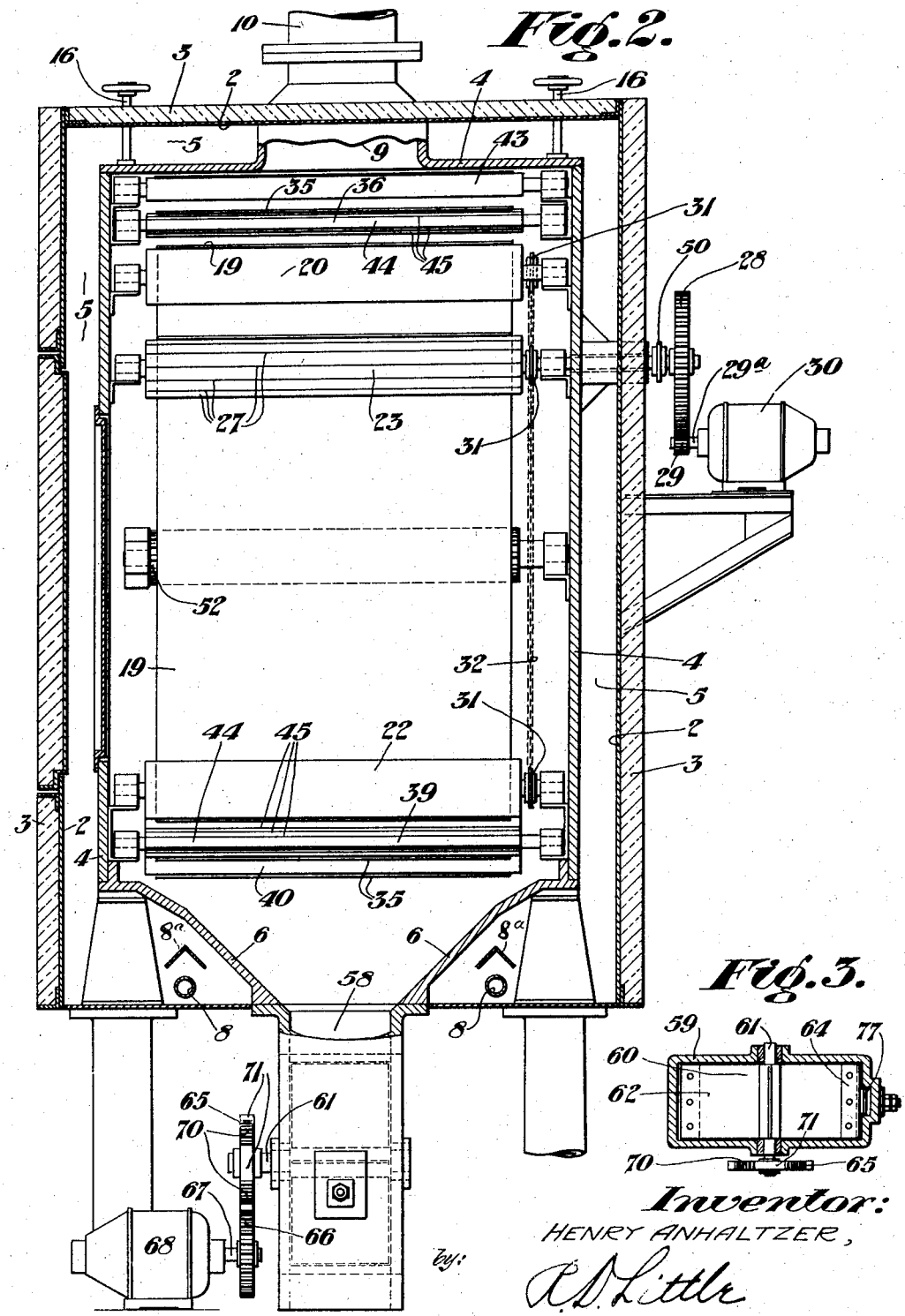

1,813,133

UNITED STATES PATENT OFFICE

HENRY ANHALTZER, OF PITTSBURGH, PENNSYLVANIA

DRYING APPARATUS

Application filed March 13, 1928. Serial No. 261,280.

This invention relates to drying apparatus and, while not limited thereto, relates more particularly to drying apparatus for drying viscous matter, and has for its object the provision of such an apparatus that will be automatic in operation.

Another object is to provide an apparatus which will provide an even thickness or layer of viscous matter for drying.

A still further object is to provide an apparatus of this class which will produce a uniformly dry product and will be generally efficient in operation.

Other objects and advantages will be disclosed in the following specification, and will be apparent from the disclosures of the accompanying drawings which illustrate one form of my invention.

In the drawings—

Figure 1 is a sectional side elevation of a drying apparatus constructed in accordance with this invention.

Figure 2 is a sectional elevation on the line II—II of Figure 1.

Figure 3 is a transverse sectional plan through the valve casing portion of the discharge conduit.

Referring more particularly to the drawings, the numeral 2 designates the outer casing or shell of the apparatus which is substantially rectangular in shape and is covered with a layer of heat insulating material 3. An inner shell or casing 4 forming a drying chamber is mounted within the outer casing 2 and spaced therefrom to form a space 5, through which the products of combustion from burners 8 circulate and heat the inner shell or drying chamber. A deflector 8ª is mounted over each of the burners 8.

The lower end of the inner shell or casing 4 is closed by a hopper-like bottom wall 6.

The shell or casing 4 has an exhaust port 9 in its top wall which is connected to an exhaust conduit 10 leading to a standard exhausting apparatus (not shown) adapted to create at least a partial vacuum within the shell 4.

A pair of spreading and flattening rollers 12 and 13 are journaled transversely of the drying chamber formed by the inner shell 4 adjacent the upper forward corner thereof. The lower roller 12 is of materially larger diameter than the upper roller 13 and forms the receiving roller upon which the viscous matter is fed. The upper roller 13 is journaled in vertically adjustable bearings 14 mounted in guideways 15 and adapted to be adjusted vertically by screws 16. The rollers 12 and 13 are geared together so as to cause simultaneous rotation thereof by long tooth gears 17 and 18, which permit a limited vertical adjustment of the rollers without disengagement of the gears.

An endless conveyer belt 19 is trained over the lower or large roller 12 and then rearwardly over a series of horizontally alined rollers 20, then down over a roller 21 slightly below and rearward of the rollers 20, then down and under the rearmost one of a series of rollers 22, arranged in a horizontal line adjacent the lower end of the shell 4; then upwardly and over the rearmost one of a series of rollers 23 arranged in a horizontal line with the roller 21. The belt 19 is then alternately trained down and under one of the rollers 22 and up and over one of the rollers 23 until it is trained about all of the rollers 22 and 23, and from the last roller 22 it is trained up to the lower spreading and flattening roller 12.

The upper rollers 23 are in contact with the product receiving side of the belt and, therefore, are made of spider formation so as to present line contacts to the belt. Each of the rollers 23 are composed of a hub portion 26 and thin knife-like rib members 27 which contact with the belt.

The roller 12 has its shaft extended through the shells 2 and 4, and is provided with a gear 28 which is in mesh with a pinion 29 on the armature shaft 29ª of a motor 30.

The roller 12, the forward one of rollers 20, roller 21, rollers 22 and rollers 23 are all provided with sprockets 31, and an endless chain 32 is trained over all of said sprockets so as to cause a simultaneous power operation of all of said rollers. Suitable idler sprockets 33 are provided to hold the chain 32 in contact with the sprockets 31.

A second endless belt 35 is trained around the upper spreading and flattening roller 13 and has its lower strand trained rearwardly over idler rollers 36, then downwardly over idler roller 37 and under idler roller 38, which rollers are spaced rearwardly beyond the rearmost lap of the conveyer belt 19; then forwardly under an idler roller 39 spaced below the series of rollers 22 and then around a tail roller 40 spaced below and forward of the forwardmost one of the rollers 22. From the roller 40 the belt 35 is returned rearwardly and under a guide-roller 41, then upwardly and over a guide-roller 42, and then forwardly over a roller 43 to the upper side of the upper flattening roller 13.

The rollers 36, 37, 38 and 39 all engage the product side of the belt, that is—the side or face which contacts with the viscous matter. Therefore, these rollers are preferably of spider formation and are composed of a hub 44 having radial blades or ribs 45 projecting therefrom which engage the belt.

A supply hopper 46 for the viscous matter to be dried is mounted at the top of the apparatus and has a conduit 47 which extends through the shells or casings 2 and 4, and delivers the viscous matter onto the belt 19 as it passes over the large lower flattening and squeezing roller 12.

A stiff rotary brush 48, preferably formed of wire, is journaled immediately forward of the roller 12 and is adapted to engage and brush the belt 19 as it passes over the roller 12. The shaft of the brush 48 is provided with a sprocket 49 which is connected to a sprocket 50 on the shaft of the roller 12 so as to provide a power drive for the brush.

A pair of fluted crimping rollers 51—52 are journaled in the forward portion of the drying chamber, formed by the shell 4, at a point intermediate the roller 12 and the series of rollers 22 and engage the opposite sides of the belt 19 so as to force said belt into the flutes of said rollers and thereby crush and break up the layer of dried material carried by the belt.

A second stiff rotary brush 53, also preferably formed of wire, is journaled immediately forward of the tail roller 40 for the belt 35 and is positioned so as to bear against and abrade or brush the surface of the belt 35 as it passes around the roller 40, thereby removing any dried material from the belt 35.

The brush 53 has a sprocket 54 secured on its shaft which is connected by a sprocket chain 55 to a sprocket 56 on the forwardmost roller 22 so as to provide a power drive for said brush.

The operation of the device so far described, is as follows—

The viscous matter to be dried will be supplied to the hopper 46 and will flow through the conduit 47 down and onto the conveyer belt 19 as it passes over the top of the lower flattening and spreading roller 12.

The roller 12 and the majority of the guide-rollers over which the belt 19 is trained are power driven. Therefore, the belt will be compelled to maintain a constant travel.

The conveyer belt 35 which is trained around the upper flattening and spreading roller 13 will also be caused to maintain a constant travel, due to the power rotation of the roller 13 which serves as a head roller or pulley.

As the belt 19, which has the viscous matter deposited thereon, advances between the rollers 12 and 13, the viscous matter will be spread out and flattened into a thin layer, due to the close setting of the rollers 12 and 13. The belt 19 will carry its thin layer of matter through the apparatus where it will be dried by the combined effect of both the heat from the burners 8 and the vacuum exhaust through the conduit 10. The upper roller 13 may be used without the belt 35 in some instances but it is preferable generally to use the belt 35 so that a constantly changing and clean surface is presented by the roller 13 to contact with and flatten or spread out the matter over the conveyer belt 19.

As the belt 19 advances through the machine, any of the viscous matter that becomes dry and flakes off will fall upon the belt 35 and be conveyed forwardly, and deposited in the hopper 6.

As the belt 19 moves upwardly along the forward end of the machine it will be crimped between the rollers 51 and 52 and the major portion of the dried matter will be crushed and broken off of the belt and will fall into the hopper 6. Any dried matter remaining on the belt as it passes onto the roller 12 will be removed by the stiff brush 48 and will fall into the hopper 6, so that the belt 19 will be entirely free of dried matter as it moves under the conduit 47, ready to receive a new charge.

When the belt 35 is not used, a certain amount of the viscous matter will stick to the roller 12, and in time builds up on said roller so as to render it necessary to clean the roller. Therefore, in the present machine, the belt 35 is provided and any of the matter picked up from the belt 19 is carried rearwardly on the belt 35 and is dried on the belt as it passes through the machine.

As the belt 35 passes over the roller 40, which serves as a tail roller or pulley for the belt 35, it is abraded or brushed by the brush 53 so that all the dried material is brushed off into the hopper 6.

The hopper 6 terminates at its lower end in a discharge conduit 58 which is enlarged intermediate its ends, as at 59, to form a valve casing in which a valve-wheel 60 is mounted. The valve-wheel 60 comprises a shaft 61 having four radially extending equally spaced valve-blades 62. The shaft 61 is journaled in line with the one side of the conduit 58 and the blades 62 are of such size as to extend completely across the conduit. The edges of the blades 62 are provided with a resilient sealing strip 64 adapted to form a seal with the side wall of the conduit.

The valve-wheel shaft 61 is provided with a mutilated gear 65 which is adapted to be meshed with a gear 66 on the armature shaft 67 of a motor 68.

The valve-wheel 60 is adapted to be rotated one quarter of a revolution at a time so that two blades will be positioned vertically and two horizontally when the wheel is stationary. The horizontal blade extending across the conduit 58 proper is adapted to intercept the dried matter from the hopper 6.

In order to insure that the valve-wheel 60 will stop in the desired position and also to provide for automatically tripping the wheel after a predetermined amount of dried matter has been deposited on the horizontal blade in the conduit 58, a spring latch 69 is provided which engages the edge of the upper vertical blade and is tensioned so as to yield when a predetermined weight of dried matter has been deposited on the horizontal blade in the conduit 58.

The mutilated gear 65 on the valve-wheel shaft 61 is provided with four segments of teeth 70 separated by spaces 71 so that when the motor is energized the gear 66 will mesh with one of the toothed segments 70 and rotate the valve-wheel one-fourth of a revolution and then will become unmeshed so as to permit the valve-wheel to stop against the spring latch 69 and be free to move again by the weight of the material.

One of the electric circuits to the motor 68 is adapted to be completed by the valve-wheel as it is moved by the latch 69 so as to automatically energize and de-energize said motor. One line 75 of the motor circuit goes directly to the motor 68, while the other line 76 is connected to the valve-wheel 60 and is adapted to be completed by the blades 62 engaging a spring contact 77 from which the line 76 is continued to the motor.

In operation, when the predetermined amount of dried matter has collected upon the valve-wheel 60, the spring latch 69 will yield to permit the wheel 60 to rotate so that the blade nearest the contact 77 will engage said contact and complete the circuit to the motor 68.

When the motor circuit is completed to the motor 68, it will rotate and cause the gear to mesh with the adjacent segment of teeth on the gear, thereby rotating the valve-wheel 60 one quarter of a revolution.

As the blade of the wheel 60, which has engaged the contact 77, moves away from the contact, the motor circuit will be broken. However, the stored energy, or momentum, of the motor will be sufficient to complete the quarter revolution of the valve-wheel 60.

While I have shown one specific and tried embodiment of my invention which is especially adapted for drying certain products, it will be expressly understood that I do not wish to be limited thereto, since various modifications may be made without departing from the scope of my invention, as defined in the appended claims.

As an example of the modifications of which I am aware, various forms of sources of heat may be substituted for the burners 8, and any suitable form of weighing valve, either automatic or manually operated, may be substituted for the valve-wheel 60. Also, the conveyer belt 35 may be trained over an arrangement of rollers so as to closely follow the path of the conveyer belt 19 and thus have a tortuous path through the drying chamber. The above and many other details of construction are all meant to be included in the scope of the claims as presented.

I claim—

1. In a drying apparatus for drying viscous matter, a pair of spreading and flattening rollers journaled in said apparatus, a plurality of guide-rollers journaled in spaced relation in said apparatus, and an endless belt for carrying the material to be dried trained over one of said spreading and flattening rollers and over and under alternate ones of said guide-rollers, all of said guide-rollers contacting with the material carrying face of said endless belt being of spider-like construction and composed of a hub and a plurality of radial blades adapted to have an edge contact with said belt.

2. A drying apparatus for drying viscous matter comprising an air-tight chamber having a vacuum exhaust outlet and a discharge port for the dried material, a source of heat, a pair of spreading and flattening rollers arranged one above the other and journaled in said chamber, a plurality of guide rollers journaled in said chamber, power means for rotating said spreading and flattening rollers and said guide rollers, a pair of endless conveyer belts for carrying the material to be dried, one of said belts being trained over the lower of said spreading and flattening rollers and over certain of said guide rollers so as to pass in a sinuous path through said chamber, and the other of said belts being trained over the upper of said spreading and flattening rollers and over other of said guide rollers so as to pass in a sinuous path through said chamber, all of said guide rollers contacting with the material carrying faces of said belts being of spider-like construction and composed of a hub and a plurality of radial blades adapted to have an edge contact with said belts.

3. A drying apparatus for drying viscous matter comprising an air-tight chamber having a vacuum exhaust outlet and a discharge port for the dried material, a source of heat, a pair of spreading and flattening rollers arranged one above the other and journaled in said chamber, at least one of said spreading and flattening rollers being adjustable vertically relative to the other, a plurality of guide rollers journaled in said chamber, power means for rotating said spreading and flattening rollers and said guide rollers, a pair of endless conveyer belts for carrying the material to be dried, one of said belts being trained over the lower of said spreading and flattening rollers and over certain of said guide rollers so as to pass in a sinuous path through said chamber, and the other of said belts being trained over the upper of said spreading and flattening rollers and over other of said guide rollers so as to pass in a sinuous path through said chamber, all of said guide rollers contacting with the material contacting faces of said belts being of spider-like construction and composed of a hub and a plurality of radial blades adapted to have an edge contact with said belts.

In testimony whereof, I have hereunto signed my name.

HENRY ANHALTZER.